United States Patent
Ikushima et al.

(10) Patent No.: US 9,566,861 B2
(45) Date of Patent: Feb. 14, 2017

(54) VEHICLE CONTROL DEVICE

(75) Inventors: Yoshihiro Ikushima, Okazaki (JP);
Hiroyuki Shimokasa, Nagoya (JP);
Koichi Hasegawa, Nagoya (JP);
Kazuhiko Matsumoto, Nagoya (JP);
Makoto Arimoto, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/408,723

(22) PCT Filed: Jun. 22, 2012

(86) PCT No.: PCT/JP2012/065991
§ 371 (c)(1),
(2), (4) Date: Dec. 17, 2014

(87) PCT Pub. No.: WO2013/190693
PCT Pub. Date: Dec. 27, 2013

(65) Prior Publication Data
US 2015/0191082 A1 Jul. 9, 2015

(51) Int. Cl.
*B60K 23/08* (2006.01)
*B60K 17/35* (2006.01)

(52) U.S. Cl.
CPC .......... *B60K 23/0808* (2013.01); *B60K 17/35* (2013.01)

(58) Field of Classification Search
CPC .......................... B60K 23/0808; B60K 17/35
USPC ........................................................ 180/249
See application file for complete search history.

(56) References Cited

U.S. PATENT DOCUMENTS

| 6,945,347 B2 | 9/2005 | Matsuno | |
|---|---|---|---|
| 8,214,124 B2 | 7/2012 | Kumabe et al. | |
| 2003/0226702 A1* | 12/2003 | Imai | B60K 23/0808 180/247 |
| 2004/0211611 A1* | 10/2004 | Ohno | B60K 17/344 180/244 |

FOREIGN PATENT DOCUMENTS

| CN | 101318472 B | 6/2011 |
|---|---|---|
| DE | 102008025174 A1 | 12/2008 |
| DE | 602004012517 T2 | 4/2009 |
| EP | 1533166 A2 | 5/2005 |
| EP | 1533166 A3 | 8/2006 |

(Continued)

*Primary Examiner* — Anne Marie Boehler
*Assistant Examiner* — Felicia L Brittman
(74) *Attorney, Agent, or Firm* — Andrews Kurth Kenyon LLP

(57) ABSTRACT

During turning of a vehicle, a vehicle body deceleration due to a cornering drag is obtained. An electronically controlled coupling is controlled to give, to rear wheels, a pre-torque set to be larger as the vehicle body deceleration is larger. Also, the pre-torque is restricted by an upper limit of the pre-torque that is set to be lower as a differential rotational speed of the front and rear wheels is smaller. By giving the pre-torque to the rear wheels, if a shift condition for a four-wheel drive state is established subsequently, a driving force can be generated in the rear wheels substantially at the same time that a fastening force of the electronically controlled coupling is increased, thereby the shift to the four-wheel drive state is immediately completed. Consequently, delay in response is not generated in the shift.

3 Claims, 11 Drawing Sheets

(56) References Cited

FOREIGN PATENT DOCUMENTS

| | | | |
|---|---|---|---|
| JP | H09-207594 | A | 8/1997 |
| JP | 2003-094971 | A | 4/2003 |
| JP | 2005-145334 | A | 6/2005 |
| JP | 2006-232100 | A | 9/2006 |
| JP | 2007-055476 | A | 3/2007 |
| JP | 2008-105472 | A | 5/2008 |
| JP | 2008-290665 | A | 12/2008 |
| JP | 2009-107382 | A | 5/2009 |
| JP | 2009-281314 | A | 12/2009 |
| JP | 2010-215061 | A | 9/2010 |
| JP | 2011-031829 | A | 2/2011 |
| JP | 2011-218871 | A | 11/2011 |
| JP | 2011-230613 | A | 11/2011 |
| JP | 2011-251579 | A | 12/2011 |
| WO | 2011151936 | A1 | 12/2011 |

* cited by examiner

VEHICLE CONTROL DEVICE

CROSS-REFERENCE TO RELATED APPLICATION

This is a national phase application based on the PCT International Patent Application No. PCT/JP2012/065991 filed Jun. 22, 2012, the entire contents of which are incorporated herein by reference.

TECHNICAL FIELD

The present invention relates to a vehicle control device capable of changing a distribution ratio of a drive torque that is given to main drive wheels and driven wheels. Specifically, the present invention relates to control of the above vehicle when it turns.

BACKGROUND ART

As a vehicle on which is mounted a driving force source such as an engine, a vehicle including a drive torque distributor is known. The drive torque distributor is capable of changing a distribution ratio of a drive torque that is given to front and rear wheels. By such a change in the distribution ratio of the drive torque, the vehicle can be switched between a two-wheel drive state in which the vehicle is driven by either the front wheels or the rear wheels, and a four-wheel drive state in which the vehicle is driven by both the front wheels and the rear wheels (see, for example, Patent Documents 1 and 2 listed below).

In the above vehicle, it is possible, according to a traveling state, to improve traveling performance of the vehicle by switching the drive state to the four-wheel drive state in which the drive torque is distributed to the front and rear wheels at a predetermined distribution ratio, or to improve a fuel consumption ratio by switching the drive state to the two-wheel drive state in which the drive torque is transmitted to either the front wheels or the rear wheels.

Also, as disclosed in Patent Document 1 below, if a four-wheel drive shift condition is established because, for example, main drive wheels slip during traveling in the two-wheel drive state, the drive torque distributor is actuated to distribute part of the drive torque to driven wheels so that the drive state is switched to the four-wheel drive state, thus traveling stability is improved.

PRIOR ART DOCUMENTS

Patent Documents

[Patent Document 1] JP 2005-145334 A
[Patent Document 2] JP 2011-230613 A
[Patent Document 3] JP 2008-290665 A
[Patent Document 4] JP 2009-281314 A

SUMMARY OF THE INVENTION

Problem to be Solved by the Invention

As disclosed also in Patent Documents 3 and 4, when the vehicle turns, generally it is known that the vehicle is decelerated due to a cornering drag (cornering resistance) that acts on steered wheels (front wheels). The deceleration of the vehicle due to the cornering drag occurs, similarly, in the above-described vehicle capable of being switched between the two-wheel drive state and the four-wheel drive state. That is, for example, when a four-wheel drive vehicle based on an FF (front-engine front-drive) vehicle turns during travel in the two-wheel drive state, it is decelerated due to the cornering drag. Accordingly, the rotational speed of the rear wheels as the driven wheels is decelerated.

Assuming that a driver requests acceleration during turning in the two-wheel drive state, a vehicle speed is increased by increase of the driving force of the front wheels as the main drive wheels, and accordingly, the rotational speed of the rear wheels is increased.

If the shift condition for the four-wheel drive state is established under such a circumstance, the vehicle is shifted to the four-wheel drive state by increasing a fastening force of the drive torque distributor.

However, in such a case, at the time of establishment of the shift condition for the four-wheel drive state, the driving force is not generated in the rear wheels. The rear wheels are rotated by a frictional force with a road surface. That is, a rotary inertia of the rear wheels is small. For this reason, even if the fastening force of the drive torque distributor is increased according to the establishment of the shift condition for the four-wheel drive state, the driving force cannot be generated in the rear wheels until the rotary inertia of the rear wheels is increased up to a predetermined value. In other words, it takes time from the establishment of the shift condition for the four-wheel drive state to actual completion of the shift to the four-wheel drive state. Consequently, a delay in response is generated in the shift to the four-wheel drive state during turning of the vehicle, which may cause an uncomfortable feeling to the driver.

The present invention was made in consideration of the above problem, an object of which is to provide a vehicle control device capable of reducing the delay in response when the shift condition for the four-wheel drive state is established during turning of the vehicle.

Means for Solving Problem

Specifically, the present invention is premised on a vehicle control device for a vehicle comprising a driving force source outputting a drive torque for traveling, main drive wheels that are either front wheels or rear wheels and driven wheels that are the other wheels, the vehicle capable of being switched between a two-wheel drive state to transmit the drive torque to only the main drive wheels and a four-wheel drive state to transmit the drive torque to both the main drive wheels and the driven wheels by changing a distribution ratio of the drive torque to the main drive wheels and the driven wheels. In such a vehicle control device, when the vehicle accelerates while turning, a pre-torque, which is set to be larger as a cornering drag that acts on steered wheels is larger, is given to the driven wheels, and when a shift condition for the four-wheel drive state is established subsequently, the drive torque to shift the vehicle to the four-wheel drive state is given to the driven wheels.

In this solving means, giving the pre-torque to the driven wheels is executed conditional on the acceleration of the vehicle while turning. Thus, it is executed even if the shift condition for the four-wheel drive state is not established. And, if the shift condition for the four-wheel drive state is established, the drive torque, which is larger than the pre-torque, is given to the driven wheels so that the vehicle is shifted to the four-wheel drive state.

Description will be given below on a function by a specific feature of this solving means. When the vehicle turns, the rotary inertia of the driven wheels is small according to decrease of a vehicle speed due to a cornering drag. For this reason, in order to increase the decreased rotary inertia of the driven wheels, the pre-torque, which is set to be larger as the cornering drag that acts on the steered wheels is larger, is given to the driven wheels, conditional on the acceleration of the vehicle while turning. If the shift condition for the four-wheel drive state is established subsequently, the distribution ratio of the drive torque to the driven wheels is increased so that the vehicle is shifted to the four-wheel drive state. At the time of shifting to the four-wheel drive state, because of the pre-torque given in advance to the driven wheels as described above, the rotary inertia of the driven wheels is high. Thus, the driving force can be generated in the driven wheels substantially at the same time that the distribution ratio of the drive torque to the driven wheels is increased after establishment of the shift condition for the four-wheel drive state, thereby the shift to the four-wheel drive state is immediately completed. That is, responsiveness to the shift to the four-wheel drive state during turning of the vehicle can be improved. Also, the pre-torque appropriate to the cornering drag can be given to the driven wheels, thus it is possible to equalize the time period from the establishment of the shift condition for the four-wheel drive state to the completion of the shift to the four-wheel drive state regardless of the rotary inertia of the driven wheels.

Furthermore, the pre-torque given to the driven wheels is obtained due to distribution of part of the drive torque for traveling to the driven wheels. And the pre-torque is restricted by an upper limit of the pre-torque that is set to be lower as a difference between a rotational speed of the front wheels and a rotational speed of the rear wheels is smaller, so that a turning characteristic of the vehicle when the vehicle turns is improved due to the rotational speed of the rear wheels higher than the rotational speed of the front wheels. That is, if the pre-torque obtained according to the cornering drag exceeds the upper limit of the pre-torque, the pre-torque given to the driven wheels is restricted by the upper limit of the pre-torque.

In order to improve a turning characteristic of the vehicle when the vehicle turns, it is preferable that, compared with a movement trajectory of the front wheels, the rear wheels pass an outer movement trajectory (close to the outside of the corner). That is, it is preferable that the vehicle turns in a state in which the rotational speed of the rear wheels is higher than the rotational speed of the front wheels. If the rotational speed of the rear wheels is decreased approximately to the rotational speed of the front wheels, the turning characteristic of the vehicle may not be improved. For this reason, the upper limit of the pre-torque is set based on the difference between the rotational speed of the front wheels and the rotational speed of the rear wheels, and the pre-torque is restricted so that the rotational speed of the rear wheels is sufficiently higher than the rotational speed of the front wheels. Thereby, the turning characteristic of the vehicle is ensured. That is, while the turning characteristic of the vehicle is ensured, an irreducible minimum pre-torque is given to the rear wheels. Thus, ensuring the turning characteristic of the vehicle and improving the responsiveness to the shift to the four-wheel drive state can go together.

Furthermore, when at least one of the turn and the acceleration of the vehicle is cancelled in a state in which the pre-torque is given to the driven wheels, without establishment of the shift condition for the four-wheel drive state, the drive torque to shift the vehicle to the four-wheel drive state is not given to the driven wheels and giving the pre-torque is cancelled.

In this way, as described above, even if the shift condition for the four-wheel drive state is not established, since the driving force is generated in the driven wheels according to the given pre-torque during turning and acceleration of the vehicle, the turn is performed in a state in which turning performance of the vehicle is improved. Also, when at least one of the turn and the acceleration of the vehicle is cancelled, since giving the pre-torque is cancelled, it is possible to shift the vehicle to the two-wheel drive state in which a fuel consumption ratio can be improved.

Effects of the Invention

In the present invention, when the vehicle accelerates while turning, the pre-torque is given to the driven wheels. Therefore, the four-wheel drive shift condition is established subsequently, the shift to the four-wheel drive state can be completed without the delay in response.

MODES FOR CARRYING OUT THE INVENTION

Hereinafter, an embodiment of the present invention will be described with reference to the drawings. In this embodiment, description will be given on a case in which the present invention is applied to a conventional vehicle (on which is mounted an engine only as a driving force source) adopting a standby four-wheel drive system based on an FF (front-engine front-drive) vehicle.

Figure 1:
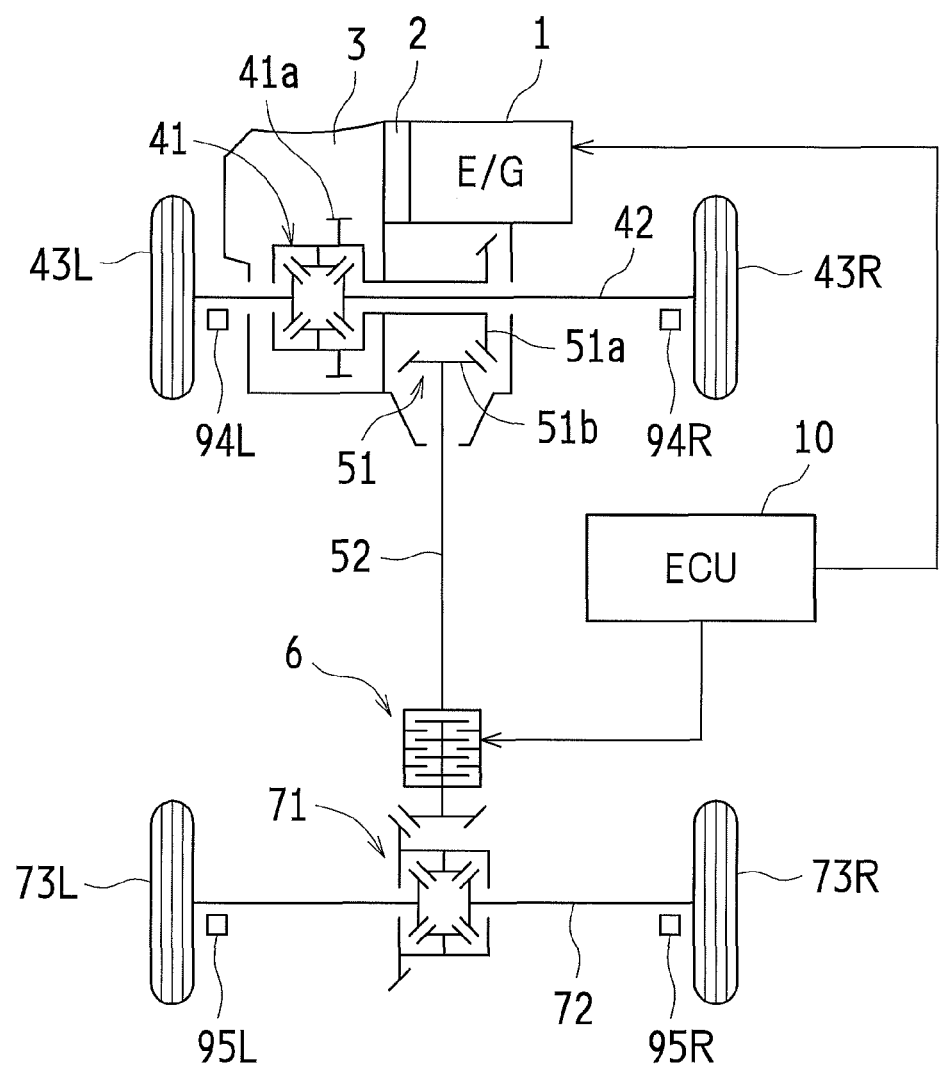
FIG. 1 is a schematic configuration diagram illustrating a vehicle according to an embodiment.

FIG. 1 is a schematic configuration diagram illustrating a vehicle according to the embodiment.

As shown in FIG. 1, the vehicle includes an engine (internal combustion engine) 1 that generates a drive torque for traveling, a torque converter 2, an automatic transmission 3, a front wheel differential device 41, a front wheel shaft (front drive shaft) 42, front wheels (main drive wheels) 43L and 43R, a transfer 51, a propeller shaft 52, an electronically controlled coupling 6, a rear wheel differential device 71, a rear wheel shaft (rear drive shaft) 72, rear wheels (driven wheels) 73L and 73R, an ECU 10 and the like. The vehicle control device of the present invention is realized by programs executed by the ECU 10.

Hereinafter, description will be given on each part such as the engine 1, the torque converter 2, the automatic transmission 3, the transfer 51, the electronically controlled coupling 6, and the ECU 10.

Engine

The engine 1 is a known power device that outputs power by burning fuel, such as a gasoline engine and a diesel engine. The engine 1 can control operating states of, for example, a throttle opening degree of a throttle valve (not shown) disposed in an intake path (opening degree for adjusting an intake air amount), a fuel injection amount and an ignition timing (in a case of the gasoline engine).

Torque Converter, Automatic Transmission and Other Elements

The torque converter 2 includes a pump impeller on the input side, a turbine runner on the output side and the like. The power is transmitted via fluid (hydraulic oil) between the pump impeller and the turbine runner. The pump impeller is coupled to a crankshaft (not shown) that is an output shaft of the engine 1. The turbine runner is coupled to an input shaft of the automatic transmission 3 via a turbine shaft.

The automatic transmission 3 is, for example, a multistage (planetary gear type) automatic transmission to set a gear stage using friction engagement devices (such as a clutch and a brake) and planetary gear devices. The automatic transmission 3 may be a continuously variable transmission (CVT) (belt type and the like) that adjusts continuously a gear ratio. Also, the transmission may be a manual transmission.

To an output shaft of the automatic transmission 3, an output gear (not shown) is integrally rotatably coupled. The output gear is meshed with a differential driven gear 41a of the front wheel differential device 41. The drive torque transmitted to the output shaft of the automatic transmission 3 is transmitted to the left and right front wheels 43L and 43R via the front wheel differential device 41 and the front wheel shaft 42. The rotational speeds of the left and right front wheels 43L and 43R are detected, respectively, by a left front wheel speed sensor 94L and a right front wheel speed sensor 94R.

Transfer

The transfer 51 includes a drive gear 51a integrally rotatably coupled to the front wheel differential device 41 and a driven gear 51b that is meshed with the drive gear 51a. The transfer 51 changes a torque transmission direction from a vehicle width direction to a backward of the vehicle body. The propeller shaft 52 is integrally rotatably coupled to the driven gear 51b. The propeller shaft 52 is coupled to the left and right rear wheels 73L and 73R via the electronically controlled coupling 6, the rear wheel differential device 71 and the rear wheel shaft 72. The drive torque transmitted from the front wheel differential device 41 to the transfer 51 is transmitted to the propeller shaft 52 and the electronically controlled coupling 6, and when the electronically controlled coupling 6 is in an engaged state (coupling torque transmission state, hereinafter also referred to as a fastened state), the drive torque is transmitted (distributed) to the left and right rear wheels 73L and 73R via the rear wheel differential device 71 and the rear wheel shaft 72. The rotational speeds of the left and right rear wheels 73L and 73R are detected, respectively, by a left rear wheel speed sensor 95L and a right rear wheel speed sensor 95R.

Electronically Controlled Coupling

The electronically controlled coupling (drive torque distributor) 6 is, for example, of a pilot clutch system, and includes a main clutch made up of a multi-disc friction clutch, a pilot clutch (electromagnetic multi-disc clutch), a cam mechanism, an electromagnet and the like. An electromagnetic force of the electromagnet engages the pilot clutch. Such an engaging force is transmitted to the main clutch by the cam mechanism, thus the main clutch is turned into the engaged state (for a specific configuration, see, for example, JP 2010-254135 A).

In the electronically controlled coupling 6, an excitation current Ie supplied to the electromagnet is controlled so as to control a torque capacity, i.e. a coupling torque Tc. Thus, a drive torque distribution ratio of the side of the rear wheels 73L and 73R to the total drive torque can be adjusted continuously, for example, within a range of 0 to 50%. The excitation current Ie to the electromagnet of the electronically controlled coupling 6 is controlled by the ECU 10.

Figure 3:
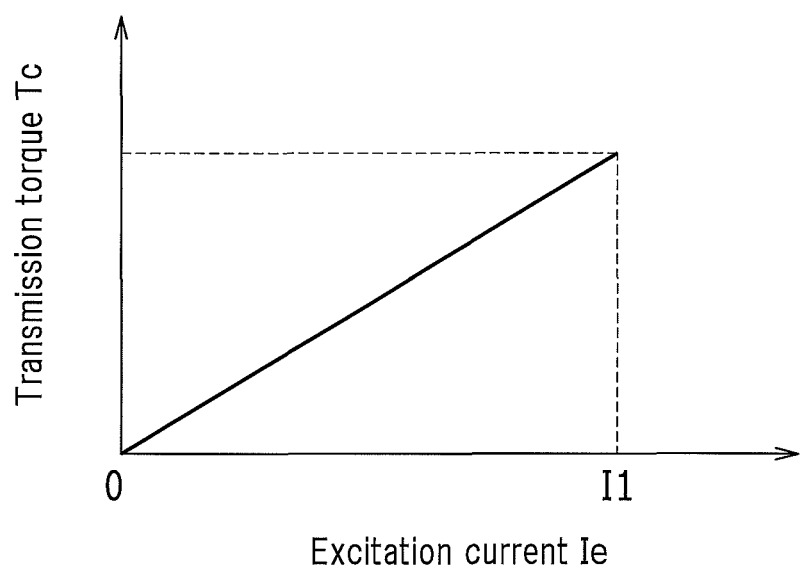
FIG. 3 is a diagram illustrating a relationship between an excitation current to an electronically controlled coupling and a transmission torque of the electronically controlled coupling.

FIG. 3 indicates a relationship between the excitation current Ie to the electromagnet of the electronically controlled coupling 6 and the transmission torque (coupling torque) Tc of the electronically controlled coupling 6. Thus, the transmission torque Tc of the electronically controlled coupling 6 can be variably controlled in accordance with the excitation current Ie, which is an actuator operation amount.

For example, when the excitation current Ie to the electronically controlled coupling 6 is "0", the main clutch is in a disengaged (released) state, and a transmission ratio of the transmission torque Tc is "0%". Thus, a travel state equivalent to a front-wheel drive state (two-wheel drive state by driving the front wheels) is realized. On the other hand, when the excitation current Ie to the electronically controlled coupling 6 is increased, the transmission torque Tc is also increased. And when the excitation current Ie is at I1 as shown in the drawing, the transmission ratio of the transmission torque Tc is "100% (i.e. the drive torque distribution ratio is 50%)". Thus, the drive torque distribution to the rear wheels 73L and 73R is at its maximum, and the travel state equivalent to a direct-connection four-wheel drive state is realized. In this way, the drive torque distribution between the front wheels and the rear wheels can be variably controlled according to the excitation current Ie to the electronically controlled coupling 6.

One example of the basic control of the electronically controlled coupling 6 by the ECU 10 is the following: when a slip occurs in the front wheels 43L and 43R during travel of the vehicle in the two-wheel drive state in which the excitation current Ie to the electromagnet of the electronically controlled coupling 6 is "0", the excitation current Ie is supplied and the coupling torque Tc is generated. Thus, the vehicle is shifted from the two-wheel drive state to the four-wheel drive state so as to ensure traveling stability. In this case, as a slip amount of the front wheels 43L and 43R is larger, the value of the excitation current Ie becomes higher, thus, the coupling torque Tc is set to be higher. It is determined whether the slip occurs in the front wheels 43L and 43R by comparing wheel speeds detected by the respective wheel speed sensors 94L, 94R, 95L and 95R. Also, when a driver selects a 4 WD mode using a 2 WD-4 WD select switch disposed in a cabin, the excitation current Ie is supplied to generate the coupling torque Tc, and thereby, the vehicle is shifted from the two-wheel drive state to the four-wheel drive state.

ECU

The ECU 10 is an electronic control device that executes drive control of the engine 1. The ECU 10 includes a CPU (Central Processing Unit), a ROM (Read Only Memory), a RAM (Random Access Memory), a backup RAM and the like.

The ROM stores various control programs and maps to be referred to when executing the various control programs. The CPU executes calculation processing based on the various control programs and the maps stored in the ROM. The RAM is a memory for temporary storing calculation results by the CPU and data input from respective sensors. The backup RAM is a nonvolatile memory for storing data to be stored when, for example, the engine 1 is stopped.

Figure 2:
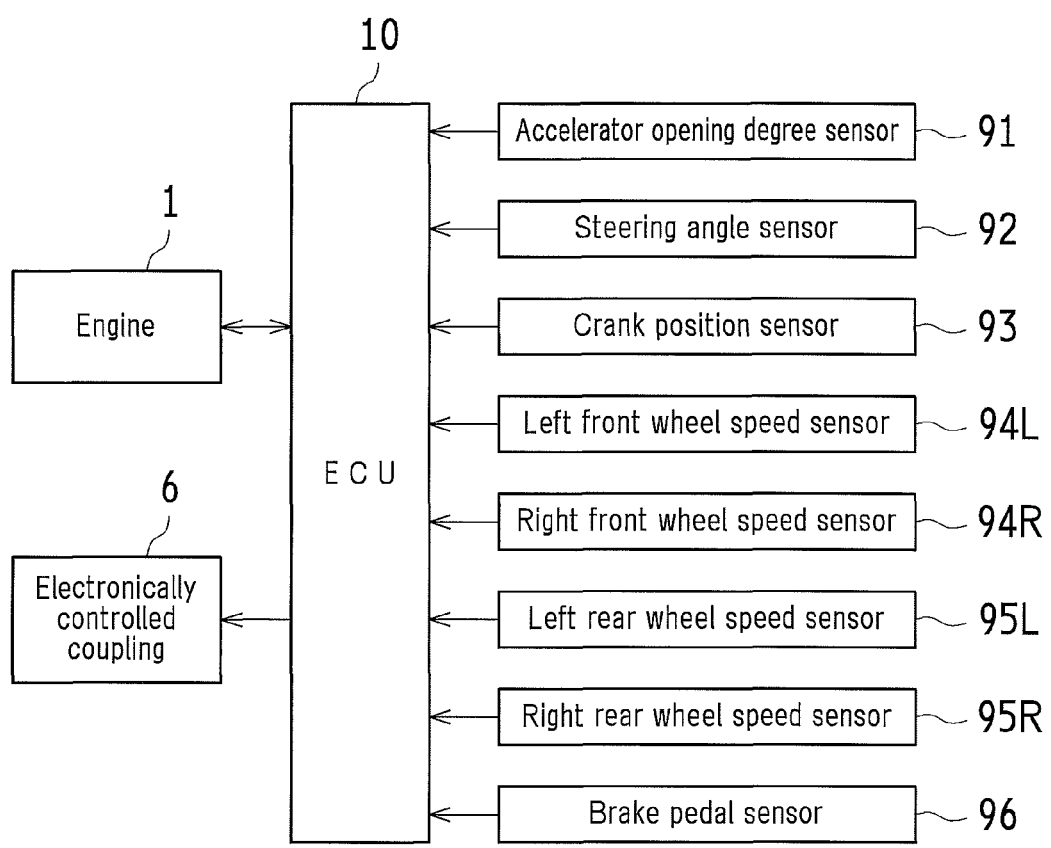
FIG. 2 is a block diagram illustrating a schematic configuration of a control system of the vehicle.

As shown in FIG. 2, to the ECU 10 are connected: an accelerator opening degree sensor 91 to detect an accelerator opening degree acc that is a stepping amount of an accelerator pedal; a steering angle sensor 92 to detect a steering angle delta of a steering; a crank position sensor 93 to output a pulse signal every time the crankshaft, which is the output shaft of the engine 1, is rotated by a predetermined angle; the left front wheel speed sensor 94L to detect the rotational speed (rotational number) of the left front wheel 43L; the right front wheel speed sensor 94R to detect the rotational speed of the right front wheel 43R; the left rear wheel speed sensor 95L to detect the rotational speed of the left rear wheel 73L; the right rear wheel speed sensor 95R to detect the rotational speed of the right rear wheel 73R; and a brake pedal sensor 96 to detect ON/OFF of a brake pedal (including detection of a brake pedal stepping force). Furthermore, to the ECU 10 are connected a water temperature sensor to detect a temperature of engine cooling water, a throttle opening degree sensor to detect the opening degree of the throttle valve disposed in the intake path, an air flow meter to detect the intake air amount, and the like. Signals from the above sensors are input to the ECU 10.

Based on the output signals from the above-described sensors, the ECU 10 executes various kinds of control of the engine 1 including throttle opening degree control (intake air amount control) of the engine 1, fuel injection amount control, ignition timing control and the like. Also, the ECU 10 controls the electronically controlled coupling 6 to execute, apart from switching control as described above between the two-wheel drive state and the four-wheel drive state, "pre-torque control at the time of turning", which is described later.

Pre-Torque Control at Time of Turning

Next, description will be given on the pre-torque control at the time of turning, which is characteristic of this embodiment.

Generally, when the vehicle turns, the vehicle speed is decreased due to the cornering drag (cornering resistance) that acts on the steered wheels, i.e. the front wheels 43L and 43R. When the vehicle turns during travel in the two-wheel drive state, the vehicle speed is decreased due to the cornering drag, and accordingly, the rotational speed of the driven wheels, i.e. the rear wheels 73L and 73R, is decreased.

Assuming that the driver requests acceleration (e.g. when the stepping amount of the accelerator pedal is increased) during turning in the two-wheel drive state, the vehicle speed is increased by increase of the driving force of the front wheels 43L and 43R according to increase of an output torque of the engine 1, and accordingly, the rotational speed of the rear wheels 73L and 73R is increased.

If the shift condition for the four-wheel drive state (e.g. the slip that occurs in the front wheels 43L and 43R) is established under such a circumstance, the vehicle is shifted to the four-wheel drive state by increasing a fastening force (engaging force) of the electronically controlled coupling 6.

However, in such a case, a rotary inertia of the rear wheels 73L and 73R is small at the time of turning in the two-wheel drive state. Thus, the driving force cannot be generated in the rear wheels 73L and 73R until the rotary inertia is increased up to a predetermined value. Consequently, it takes time from establishment of the shift condition for the four-wheel drive state to actual generation of the driving force in the rear wheels 73L and 73R, and to completion of the shift to the four-wheel drive state. That is, a delay in response is generated in the shift to the four-wheel drive state during turning of the vehicle.

In view of the above, in this embodiment, the fastening force of the electronically controlled coupling 6 is controlled to give the pre-torque to the rear wheels 73L and 73R according to the rotary inertia of the rear wheels 73L and 73R (rotary inertia being small affected by the above-described cornering drag) when the vehicle accelerates while turning. That is, even if the shift condition for the four-wheel drive state is not established, the fastening force of the electronically controlled coupling 6 is controlled conditional on the vehicle accelerating while turning. Thus, the pre-torque is given to the rear wheels 73L and 73R.

After that, when the shift condition for the four-wheel drive state is established due to the slip and the like that occurs in the front wheels 43L and 43R, the fastening force of the electronically controlled coupling 6 is increased so as to give the drive torque for the four-wheel drive state to the rear wheels 73L and 73R, thereby the vehicle is shifted to the four-wheel drive state. Thus, it is possible to reduce the delay in response when the shift condition for the four-wheel drive state is established during turning of the vehicle.

Figure 4:
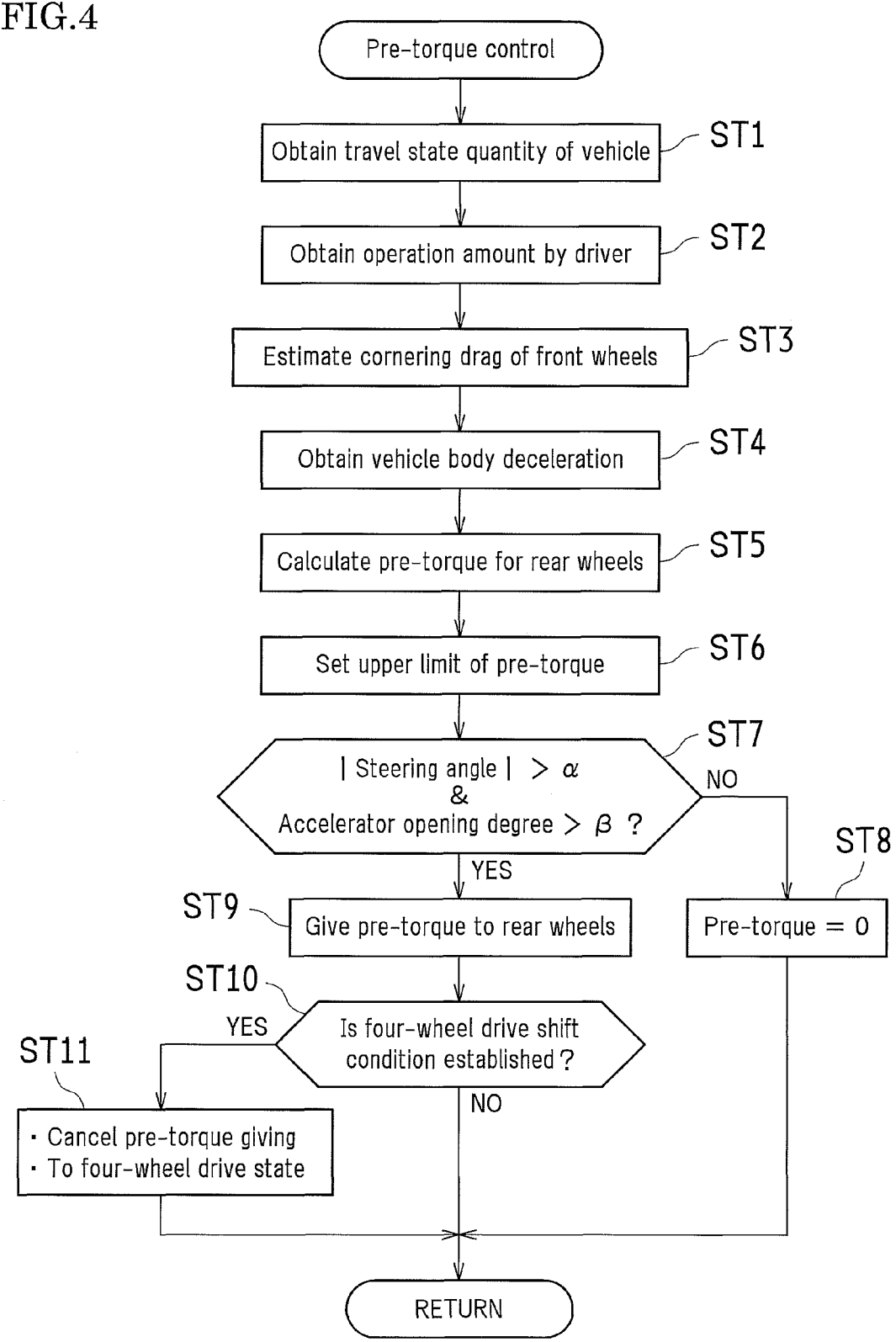
FIG. 4 is a flowchart illustrating a procedure of pre-torque control.

Next, description will be given on a specific procedure of the pre-torque control at the time of turning. FIG. 4 is a flowchart illustrating the operation procedure of the pre-torque control. The flowchart indicated in FIG. 4 is executed every several msec during travel of the vehicle in the two-wheel drive state.

The rotary inertia of the rear wheels 73L and 73R is correlated with: a vehicle body deceleration affected by the cornering drag that acts on the steered wheels (front wheels 43L and 43R) when the vehicle turns; the cornering drag that acts on the steered wheels when the vehicle turns; and the steering angle when the vehicle turns. Any of them can be used as an index for indicating a size of the rotary inertia of the rear wheels 73L and 73R. That is, the rotary inertia becomes smaller as the vehicle body deceleration is larger. The rotary inertia becomes smaller as the cornering drag is larger. The rotary inertia becomes smaller as the steering angle is larger. In the pre-torque control below, description will be given on a case in which the vehicle body deceleration affected by the cornering drag is used as the index for indicating the size of the rotary inertia of the rear wheels 73L and 73R.

In step ST1, an actual travel state quantity of the vehicle is obtained. The travel state quantity is, for example, a wheel speed, an input torque to the drive system, and the like. The wheel speeds of the wheels 43L, 43R, 73L and 73R are respectively detected by the wheel speed sensors 94L, 94R, 95L and 95R. The input torque to the driving system corresponds to the output torque of the engine 1, which is obtained from the accelerator opening degree acc detected by the accelerator opening degree sensor 91 and from an engine rotational speed calculated based on the output signal from the crank position sensor 93. For example, a required driving force (required power) set according to the accelerator opening degree acc is divided by the engine rotational speed, thereby the output torque of the engine 1 is calculated. Thus, the input torque to the driving system is obtained.

After obtaining the actual travel state quantity of the vehicle as described above, the procedure advances to step ST2, where an operation amount by the driver is obtained. The operation amount is the accelerator opening degree acc, the steering angle delta of the steering, and the like. The accelerator opening degree acc is detected by the accelerator opening degree sensor 91. The steering angle delta of the steering is detected by the steering angle sensor 92.

Figure 5:
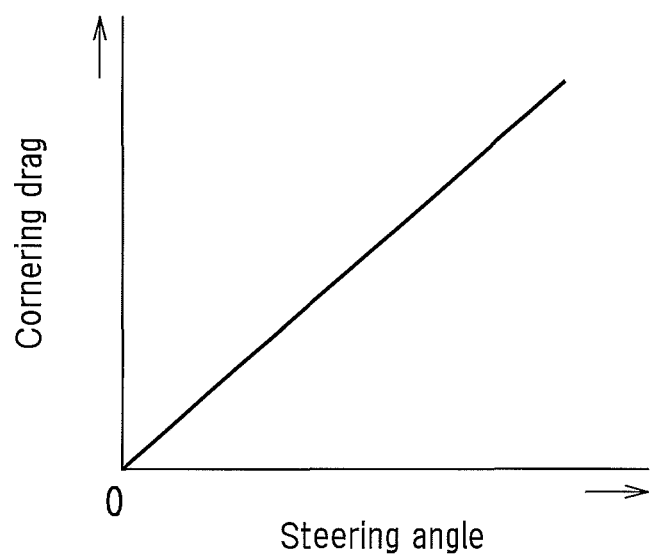
FIG. 5 is a diagram illustrating a cornering drag map.

The procedure advances to step ST3, where the cornering drag (cornering resistance) acting on the front wheels 43L and 43R is estimated. The estimation of the cornering drag is performed based on a cornering drag map previously stored in the ROM. The cornering drag map defines the relationship between the steering angle delta of the steering and the cornering drag acting on the front wheels 43L and 43R. The cornering drag map is obtained in advance by experiments and/or simulations. FIG. 5 shows one example of the cornering drag map. As it can be seen, the cornering drag map is created so that the value of the cornering drag acting on the front wheels 43L and 43R can be obtained as a larger value, as the steering angle delta is larger.

Figure 6:
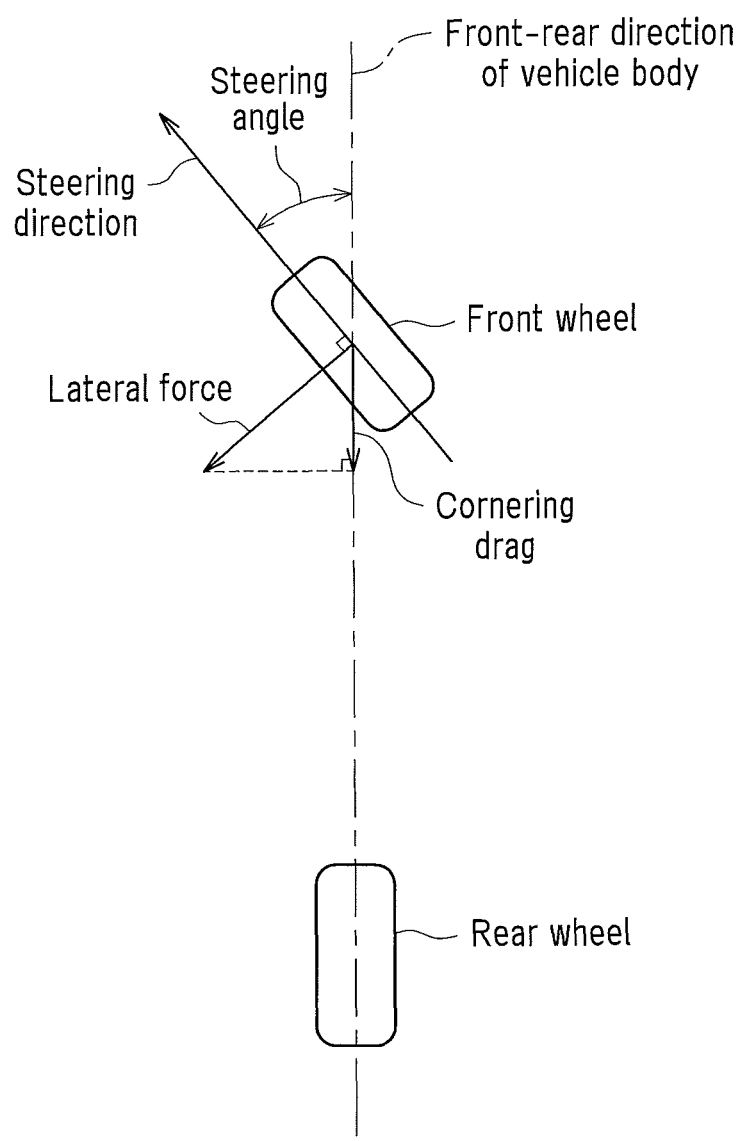
FIG. 6 is a conceptual diagram for explaining the cornering drag according to a steering angle.

Here, the cornering drag will be described. FIG. 6 is a conceptual diagram for explaining the cornering drag acting on one (e.g. left side) front wheel. In FIG. 6, the cornering drag is indicated according to the steering angle.

As shown in FIG. 6, when the front wheel is steered at a predetermined steering angle, a lateral force acts on the front wheel in a direction perpendicular to the steering direction. The cornering drag is a force corresponding to a component of the lateral force, the component being along a front-rear direction of the vehicle body. The cornering drag is obtained by the following formula (1):

$$\text{Cornering drag} = Fs \times \sin Ds \quad (1)$$

Here, the lateral force is represented by Fs, and the steering angle is represented by Ds.

Thus, the larger the steering angle becomes, the larger the cornering drag becomes. In the cornering drag map as shown in FIG. 5, the cornering drag according to the steering angle can be obtained based on the above relationship. Also, since the cornering drag acts on as a travel resistance, the vehicle deceleration becomes larger as the cornering drag becomes larger, i.e. as the steering angle becomes larger. And, the rotary inertia of the rear wheels 73L and 73R becomes smaller as the vehicle deceleration becomes larger.

After the estimation of the cornering drag, in step ST4, the vehicle deceleration affected by the cornering drag is obtained. The vehicle deceleration is proportional to the size of the cornering drag. For example, the map that defines the relationship between the cornering drag and the vehicle deceleration is created in advance by experiments and/or simulations. The vehicle deceleration is obtained from the map.

The vehicle deceleration of the vehicle may be measured by the sensor and the like. The vehicle deceleration may be obtained based on, for example: the respective rotational speeds of the wheels 43L, 43R, 73L and 73R detected respectively by the wheel speed sensors 94L, 94R, 95L and 95R; an output from an acceleration sensor not shown; and an output from a vehicle body speed sensor not shown.

The procedure advances to step ST5, where the pre-torque necessary for increasing the rotary inertia of the rear wheels 73L and 73R is obtained. The pre-torque is obtained as a value according to the vehicle deceleration. As the vehicle deceleration becomes larger, the rotary inertia of the rear wheels 73L and 73R becomes smaller, thus, in this case, a relatively large value is obtained as the pre-torque. For example, the pre-torque is obtained by a predetermined arithmetic expression where the vehicle deceleration is defined as a variable. Also, the map for obtaining the pre-torque from the vehicle deceleration may be created in advance by experiments and/or simulations. Thus, the map (pre-torque map) may be stored in the ROM so that the pre-torque is obtained from the pre-torque map. Here, the obtained pre-torque is, for example, about several dozen Nm, which is small, approximately one-tenth of the drive torque (about several hundred Nm) given to the rear wheels 73L and 73R during the four-wheel drive.

The pre-torque is not necessarily obtained based on the vehicle deceleration. It may be obtained as a value according to the size of the cornering drag or the size of the steering angle. That is, as the cornering drag becomes larger, or as the steering angle becomes larger, the vehicle deceleration becomes larger, and in such a case, the pre-torque is obtained as a relatively large value. As described above, all of the vehicle deceleration, the size of the cornering drag and the size of the steering angle are correlated with the rotary inertia of the rear wheels 73L and 73R. That is, as the vehicle deceleration becomes larger, the rotary inertia of the rear wheels 73L and 73R becomes smaller. As the cornering drag becomes larger, the rotary inertia of the rear wheels 73L and 73R becomes smaller. As the steering angle becomes larger, the rotary inertia of the rear wheels 73L and 73R becomes smaller. For this reason, obtaining the pre-torque according to the vehicle deceleration, obtaining the pre-torque according to the size of the cornering drag, and obtaining the pre-torque according to the size of the steering angle are all synonymous with obtaining the pre-torque according to the rotary inertia of the rear wheels 73L and 73R.

After obtaining the pre-torque in this way, the procedure advances to step ST6, where an upper limit of the pre-torque is set. Hereinafter, the upper limit of the pre-torque will be described.

When the fastening force of the electronically controlled coupling 6 is increased during turning of the vehicle, the rotational speed of the rear wheels 73L and 73R comes close to the rotational speed of the front wheels 43L and 43R.

Generally, in order to improve a turning characteristic of the vehicle at the time of turning, it is preferable that, compared with a movement trajectory (cornering trajectory) of the front wheels 43L and 43R, the rear wheels 73L and 73R pass an outer movement trajectory (close to the outside of the corner), that is, it is preferable that the vehicle turns in a so-called oversteer trend. In other words, it is preferable that the vehicle turns in a state in which the rotational speed (rotational number) of the rear wheels 73L and 73R is higher than the rotational speed of the front wheels 43L and 43R.

For this reason, when the fastening force of the electronically controlled coupling 6 is increased so as to increase the pre-torque, if the fastening force is increased beyond necessity, the rotational speed of the front wheels 43L and 43R comes close to the rotational speed of the rear wheels 73L and 73R. (The rotational speed of the rear wheels 73L and 73R is decreased approximately to the rotational speed of the front wheels 43L and 43R.) Accordingly, the turning characteristic of the vehicle cannot be improved. In order to avoid such a circumstance, the upper limit of the pre-torque is set.

Specifically, a differential rotational speed of the front and rear wheels (deviation in the rotational speeds of the front and rear wheels) is calculated. As the differential rotational speed is smaller, the upper limit of the pre-torque is set to be lower. That is, the pre-torque is restricted so that the rotational speed of the rear wheels 73L and 73R is not decreased approximately to the rotational speed of the front wheels 43L and 43R.

The differential rotational speed of the front and rear wheels is calculated in the following manner: The front wheel speed is obtained as an average value of the rotational speed of the left front wheel 43L detected by the left front wheel speed sensor 94L and the rotational speed of the right front wheel 43R detected by the right front wheel speed sensor 94R. The rear wheel speed is obtained as an average value of the rotational speed of the left rear wheel 73L detected by the left rear wheel speed sensor 95L and the rotational speed of the right rear wheel 73R detected by the right rear wheel speed sensor 95R. Thus, the differential rotational speed of the front and rear wheels is calculated as a value obtained by subtracting the front wheel speed from the rear wheel speed.

Figure 7:
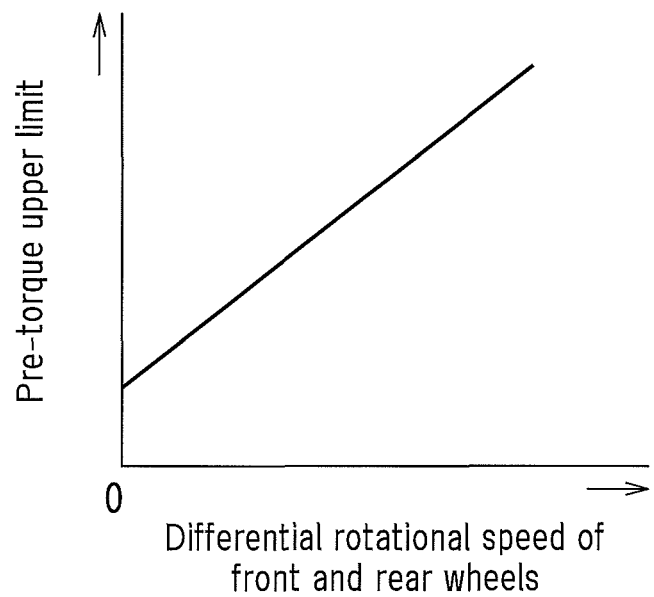
FIG. 7 is a diagram illustrating a pre-torque upper limit map.

FIG. 7 indicates a pre-torque upper limit map for obtaining the upper limit of the pre-torque according to the differential rotational speed of the front and rear wheels. As shown in FIG. 7, as the differential rotational speed of the front and rear wheels is smaller, i.e. as the turning characteristic of the vehicle degrades more because the rotational speed of the rear wheels 73L and 73R comes close to the rotational speed of the front wheels 43L and 43R, the upper limit of the pre-torque is set to be lower (the fastening force of the electronically controlled coupling 6 is set to be smaller). Thus, the turning characteristic of the vehicle can be maintained by restricting the size of the pre-torque. In other words, while the turning characteristic of the vehicle is maintained in a good state by restricting the pre-torque by the upper limit of the pre-torque, the delay in response to the four-wheel drive state can be reduced due to an irreducible minimum pre-torque given to the rear wheels 73L and 73R, if the shift condition for the four-wheel drive state is established subsequently.

After setting the upper limit of the pre-torque in this way, the procedure advances to step ST7, where it is determined whether the steering angle (absolute value of the steering angle) of the steering detected by the steering angle sensor 92 exceeds a predetermined threshold value α and furthermore the accelerator opening degree detected by the accelerator opening degree sensor 91 exceeds a predetermined threshold value β.

The above determination is to determine whether the vehicle is turning while accelerating, i.e., whether the vehicle is in a travel state in which it is necessary to give the pre-torque to the rear wheels 73L and 73R. For example, the threshold value α of the steering angle is set to 10°, and the threshold value β of the accelerator opening degree is set to 10%. These values are not limited thereto. They are set appropriately based on experiments and/or simulations.

When the steering angle of the steering is less than or equal to the threshold value α, or the accelerator opening degree is less than or equal to the threshold value β, it is determined NO in step ST7 and the procedure advances to step ST8, where the pre-torque is set to "0". That is, the electronically controlled coupling 6 becomes in a released state in which the pre-torque is not given to the rear wheels 73L and 73R. It is not necessary to give the pre-torque, because when the steering angle of the steering is small or "0", the cornering drag is small or "0", and the vehicle deceleration is also small or "0". In this case, the cornering drag estimated in step ST3 is small, and also the pre-torque obtained in step ST5 is small.

When the accelerator opening degree is small or "0", the output torque of the engine 1 is small or "0". Thus, even if the electronically controlled coupling 6 is fastened, the pre-torque is not transmitted to the rear wheels 73L and 73R. In this case also, the pre-torque is set to "0".

On the other hand, when the steering angle of the steering exceeds the predetermined threshold value α, and furthermore the accelerator opening degree exceeds the predetermined threshold value β, it is determined YES in step ST7 and the procedure advances to step ST9. In step ST9, the pre-torque is given to the rear wheels 73L and 73R. In this case, when the pre-torque obtained in step ST5 is less than or equal to the upper limit of the pre-torque set in step ST6, the electronically controlled coupling 6 is controlled so that the pre-torque obtained in step ST5 is given to the rear wheels 73L and 73R. On the other hand, when the pre-torque obtained in step ST5 exceeds the upper limit of the pre-torque set in step ST6, the electronically controlled coupling 6 is controlled so that the pre-torque restricted by the upper limit is given to the rear wheels 73L and 73R.

In the control of the electronically controlled coupling 6, the excitation current Ie supplied to the electromagnet of the electronically controlled coupling 6 is controlled so that the transmission torque Tc as shown in FIG. 3 is coincident with the above-described pre-torque.

The procedure advances to step ST10 with the state in which the pre-torque is given to the rear wheels 73L and 73R. It is determined whether the four-wheel drive shift condition is established. Specifically, it is determined whether the shift condition for the four-wheel drive state is established due to, for example, occurrence of the slip in the front wheels 43L and 43R. The determination whether the four-wheel drive shift condition is established is performed in a four-wheel drive control routine (not shown) that is different from a pre-torque control routine as shown in FIG. 4. If it is determined, in the four-wheel drive control routine, that the four-wheel drive shift condition is established (for example, when a four-wheel drive flag is "1" due to the occurrence of the slip in the front wheels 43L and 43R), it is determined YES in step ST10 in the pre-torque control routine.

When it is determined NO in step ST10 due to the four-wheel drive shift condition not being established, the procedure returns while maintaining the state in which the pre-torque is given to the rear wheels 73L and 73R. From the next routine, operations in the above-described steps ST1 to ST10 are repeated conditional on the operation state to be determined YES in step ST7, i.e. conditional on the vehicle being turning while accelerating. That is, the state in which the pre-torque according to the travel state of the vehicle is given to the rear wheels 73L and 73R is maintained. In this case, when the steering angle of the steering is changed, the cornering drag is changed, and accordingly the vehicle deceleration is changed. Thus, the value of the pre-torque obtained in step ST5 is changed. As a result, every time the operations in steps ST1 to ST10 are repeated, the pre-torque given to the rear wheels 73L and 73R is changed according to the steering angle of the steering. (When the pre-torque obtained in step ST5 is not restricted by the upper limit of the pre-torque.)

Also, when it is determined NO in step ST7 with the state in which the pre-torque is given to the rear wheels 73L and 73R, the pre-torque is set to "0". Here, the pre-torque is set to "0" because it is determined that the travel state does not need the pre-torque.

On the other hand, when the four-wheel drive shift condition is established with the state in which the pre-torque is given, and thus it is determined YES in step ST10, the procedure advances to step ST11. In order to shift the vehicle to the four-wheel drive state, giving the pre-torque is cancelled and the electronically controlled coupling 6 is controlled to transmit the drive torque necessary for the four-wheel drive state to the rear wheels 73L and 73R. That is, a distribution control of the drive torque (for example, the distribution control according to the slip amount of the front wheels 43L and 43R) is performed in the four-wheel drive control routine.

By repeating the above-described operations, when the vehicle turns while accelerating, the electronically controlled coupling 6 is controlled so that the pre-torque is given to the rear wheels 73L and 73R.

Figure 8:
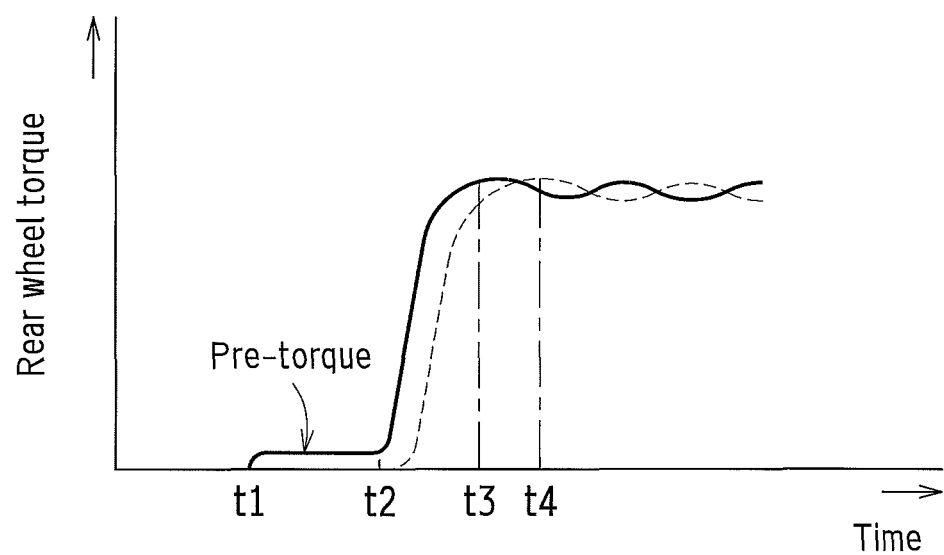
FIG. 8 is a diagram illustrating a temporal variation of a rear wheel torque when the vehicle is switched from a two-wheel drive state to a four-wheel drive state during turning. In this diagram, the temporal variation of the rear wheel torque according to the embodiment is indicated by a solid line, and the temporal variation of the rear wheel torque according to a conventional art is indicated by a dashed line.

FIG. 8 indicates a variation of the torque given to the rear wheels 73L and 73R when the vehicle is shifted from the two-wheel drive state to the four-wheel drive state during turning. The temporal variation of the rear wheel torque according to a conventional art is indicated by a dashed line, and the temporal variation of the rear wheel torque according to this embodiment is indicated by a solid line. In FIG. 8, the vehicle starts to turn and accelerate at the timing t1, and the four-wheel drive shift condition is established at the timing t2 due to the slip that occurs in the front wheels 43L and 43R.

In the conventional art, no torque is given to the rear wheels 73L and 73R until the four-wheel drive shift condition is established. From the timing at which the four-wheel drive shift condition is established (timing t2), the electronically controlled coupling 6 is controlled to distribute the drive torque to the rear wheels 73L and 73R. At the timing t4, the shift to the four-wheel drive state is completed.

In contrast, in this embodiment, the electronically controlled coupling 6 is controlled to give the pre-torque to the rear wheels 73L and 73R from the timing at which the vehicle starts to turn and accelerate (timing t1). Also, from the timing at which the four-wheel drive shift condition is established (timing t2), the electronically controlled coupling 6 is further controlled to distribute the drive torque to the rear wheels 73L and 73R. At timing t3, the shift to the four-wheel drive state is completed.

In this embodiment, the shift to the four-wheel drive state is completed earlier than that in the conventional art by the deviation between the timings t3 and t4. Thus, the delay in response to the four-wheel drive state is remarkably reduced.

As described above, in this embodiment, the pre-torque is given to the rear wheels 73L and 73R when the vehicle turns while accelerating. Thus, the rotary inertia of the rear wheels 73L and 73R, which is small due to the cornering drag, can be increased. If the four-wheel drive shift condition is established subsequently, the driving force can be generated in the rear wheels 73L and 73R substantially at the same time that the fastening force of the electronically controlled coupling 6 is increased, thereby the shift to the four-wheel drive state is immediately completed. Consequently, the delay in response is not generated in the shift to the four-wheel drive state during turning of the vehicle, which does not cause an uncomfortable feeling to the driver.

Also, when the four-wheel drive shift condition is not established in the state in which the pre-torque is given to the rear wheels 73L and 73R, giving the pre-torque is cancelled subsequently. However, since the pre-torque is appropriately given to the rear wheels 73L and 73R during turning of the vehicle, it is possible to maintain the good turning performance of the vehicle. In this case, the pre-torque is restricted by the upper limit of the pre-torque, thus the good turning characteristic can be maintained.

(Variation 1)

Variation 1 will be described. In the above-described embodiment, the description was given on the case in which the cornering drag is determined according to the steering angle. In order to obtain the cornering drag with high accuracy, it is preferable to consider the steering angle and the vehicle speed. Hereinafter, description will be given on the cornering drag that is obtained based on the steering angle and the vehicle speed.

Figure 9:
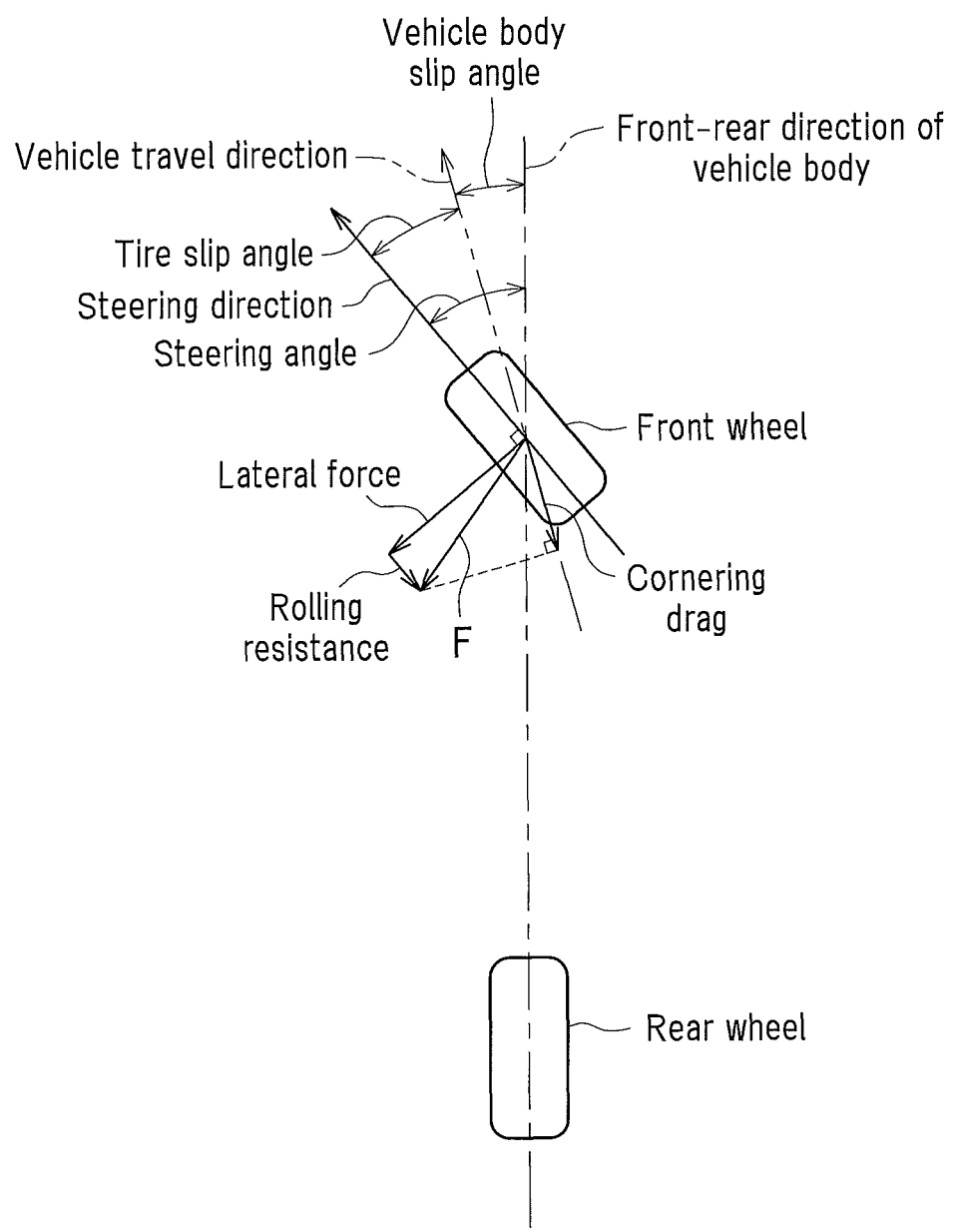
FIG. 9 is a conceptual diagram for explaining a cornering drag according to a steering angle and a tire slip angle in Variation 1.

FIG. 9 is a conceptual diagram of the cornering drag that acts on the one (e.g. left side) front wheel. As shown in FIG. 9, when the front wheel is steered at a predetermined steering angle, a lateral force acts on the front wheel, due to a friction between the tire and the road surface, in a direction perpendicular to the steering direction in which the front wheel turns. Also, due to the slip between the tire and the road surface, the actual vehicle travel direction is deviated at the tire slip angle relative to the steering direction. The larger the tire slip angle (i.e. steering angle) becomes, the larger the lateral force becomes. A force F is obtained by composing a rolling resistance with the lateral force. The cornering drag is a component in the direction opposite to the vehicle travel direction in the force F.

As the vehicle speed becomes higher, the tire slip angle becomes larger. Consequently, the cornering drag can be obtained based on the steering angle and the vehicle speed. That is, when the steering angle is the same, as the vehicle speed becomes higher, the tire slip angle becomes larger. Accordingly, the cornering drag is obtained as a relative large value. In other words, as the steering angle becomes larger and/or the vehicle speed becomes higher, the cornering drag becomes larger and the rotary inertia of the rear wheels 73L and 73R becomes smaller.

In this way, it is possible to obtain the cornering drag with high accuracy by considering the vehicle speed. As a result, the vehicle body deceleration affected by the cornering drag can be obtained with high accuracy, thus, the pre-torque can be appropriately adjusted.

(Variation 2)

Variation 2 will be described. Variation 2 is a variation of the pre-torque upper limit map. In the above-described embodiment, the relationship between the differential rotational speed of the front and rear wheels and the upper limit of the pre-torque is linearly indicated (see the pre-torque upper limit map in FIG. 7). In contrast, the pre-torque upper limit map in this Variation is as shown in FIG. 10.

Figure 10:
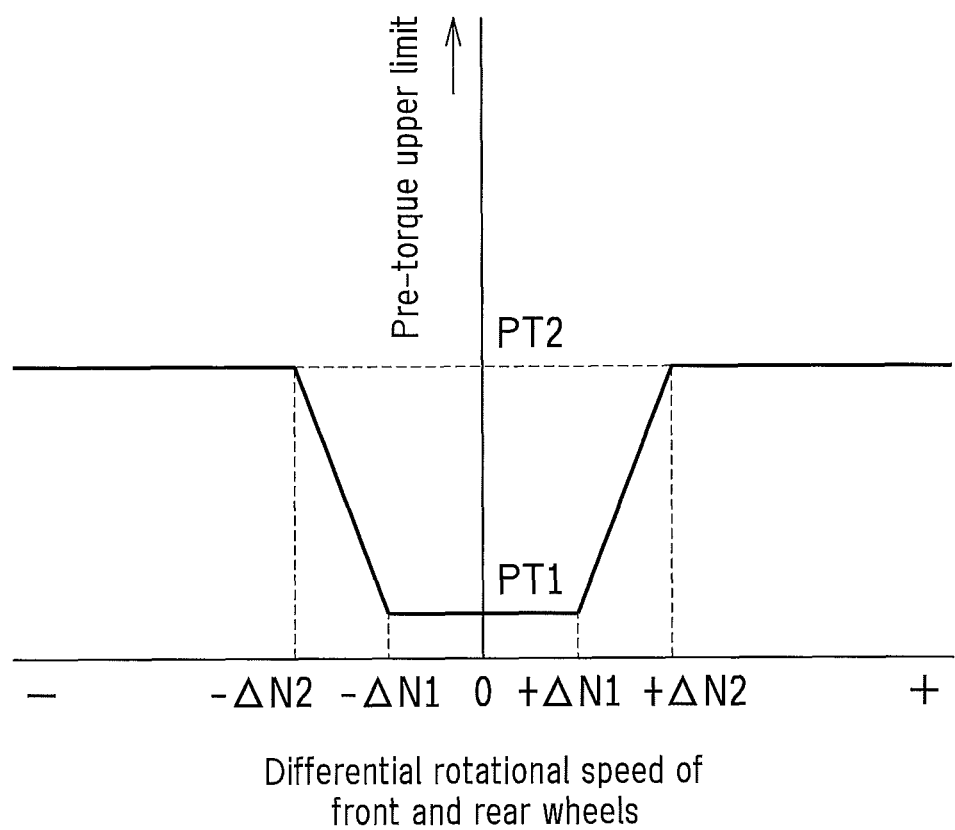
FIG. 10 is a diagram illustrating a pre-torque upper limit map in Variation 2.

In the pre-torque upper limit map indicated in FIG. 10, the positive side of the horizontal axis, i.e. the axis of the differential rotational speed of the front and rear wheels, indicates a range in which the rotational speed of the rear wheels 73L and 73R is higher than the rotational speed of the front wheels 43L and 43R. The negative side of the horizontal axis indicates the range in which the rotational speed of the front wheels 43L and 43R is higher than the rotational speed of the rear wheels 73L and 73R.

In the pre-torque upper limit map, when the differential rotational speed of the front and rear wheels is in a relatively small range (range from $-\Delta N1$ to $+\Delta N1$ in FIG. 10), that is, when the turning characteristic of the vehicle cannot be improved due to the rotational speed of the rear wheels 73L and 73R that comes close to the rotational speed of the front wheels 43L and 43R, the upper limit of the pre-torque is set to a low value (PT1 in the drawing). On the other hand, when the differential rotational speed of the front and rear wheels is in a relatively large range (range less than or equal to $-\Delta N2$ and more than or equal to $+\Delta N2$ in FIG. 10), that is, when the turning characteristic of the vehicle can be improved due to the sufficiently large difference between the rotational speed of the front wheels 43L and 43R and the rotational speed of the rear wheels 73L and 73R, the upper limit of the pre-torque is set to a high value (PT2 in the drawing). The upper limit of the pre-torque PT2 is set as a value that does not restrict the pre-torque obtained in step ST5 of the flowchart in FIG. 4, i.e., a value in which the pre-torque obtained in step ST5 is directly given to the rear wheels 73L and 73R.

Also, when the differential rotational speed of the front and rear wheels is in the range from $-\Delta N1$ to $-\Delta N2$ in FIG. 10, or when it is in the range from $+\Delta N1$ to $+\Delta N2$ in FIG. 10, the upper limit of the pre-torque is set to be lower as the absolute value of the differential rotational speed of the front and rear wheels becomes smaller.

When the pre-torque is restricted based on the pre-torque upper limit map, it is possible to certainly improve the turning characteristic of the vehicle by ensuring a region in which the upper limit of the pre-torque is set to the low value (PT1 in the drawing).

(Variation 3)

Variation 3 will be described. In the above-described embodiment, the description was given, as an example, on the conventional vehicle adopting the standby four-wheel drive system based on an FF vehicle. In this Variation, description will be given on a hybrid vehicle (on which are mounted an engine and a motor as the driving force sources) adopting the standby four-wheel drive system based on the FF vehicle.

Figure 11:
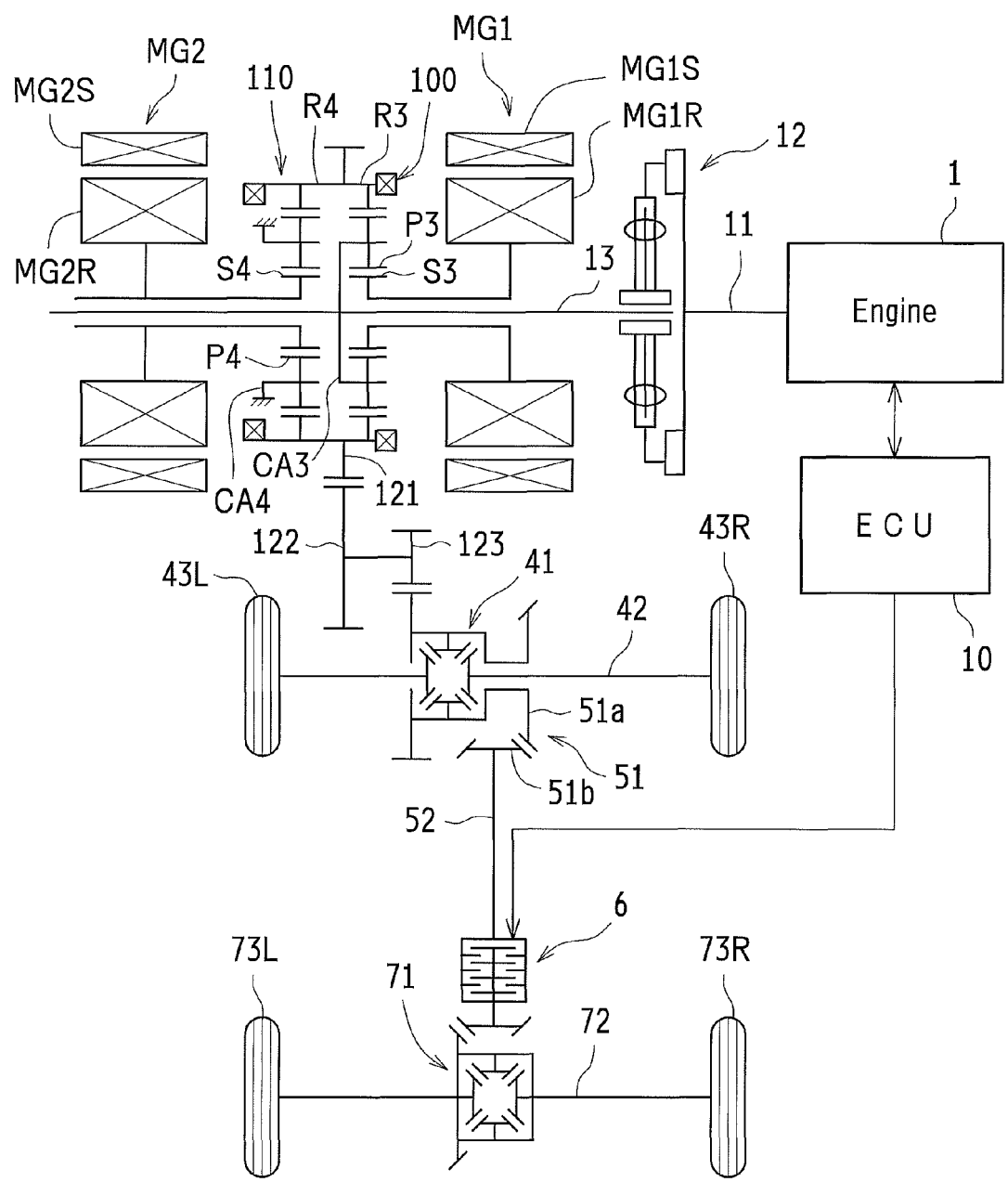
FIG. 11 is a schematic configuration diagram illustrating a vehicle according to Variation 3.

FIG. 11 is a schematic configuration diagram illustrating the vehicle according to this Variation. The hybrid vehicle according to this Variation includes the engine 1 that generates the drive torque for traveling, a first motor generator MG1 that mainly functions as a generator, a second motor generator MG2 that mainly functions as a motor, a power splitter 100, a reduction mechanism 110, a counter drive gear 121, a counter driven gear 122, a final gear 123, the front wheel differential device 41, the front wheel shaft (front drive shaft) 42, the front wheels (main drive wheels) 43L and 43R, the transfer 51, the propeller shaft 52, the electronically controlled coupling 6, the rear wheel differential device 71, the rear wheel shaft (rear drive shaft) 72, the rear wheels (driven wheels) 73L and 73R, the ECU 10 and the like.

The ECU 10 is made up of, for example, an HV (hybrid) ECU, an engine ECU and a battery ECU, which are connected to each other in a manner capable of communicating to each other.

Since the configurations of the engine 1, the transfer 51 and the electronically controlled coupling 6 are the same as those in the above-described embodiment, the description is omitted here. The output of the engine 1 is transmitted to an input shaft 13 via a crankshaft 11 and a damper 12. The damper 12 is, for example, a coil spring type transaxle damper that absorbs a torque fluctuation of the engine 1.

Hereinafter, description will be given on the motor generators MG1 and MG2, the power splitter 100 and the reduction mechanism 110.

Motor Generator

The first motor generator MG1 is an AC synchronous generator that includes: a rotor MG1R made of a permanent magnet that is rotatably supported by the input shaft 13; and a stator MG1S on which a three-phase winding is wound. The first motor generator MG1 functions as a generator and as a motor. Similarly, the second motor generator MG2 is an AC synchronous generator that includes: a rotor MG2R made of a permanent magnet that is rotatably supported by the input shaft 13; and a stator MG2S on which a three-phase winding is wound. The second motor generator MG2 functions as a motor and as a generator.

Figure 12:
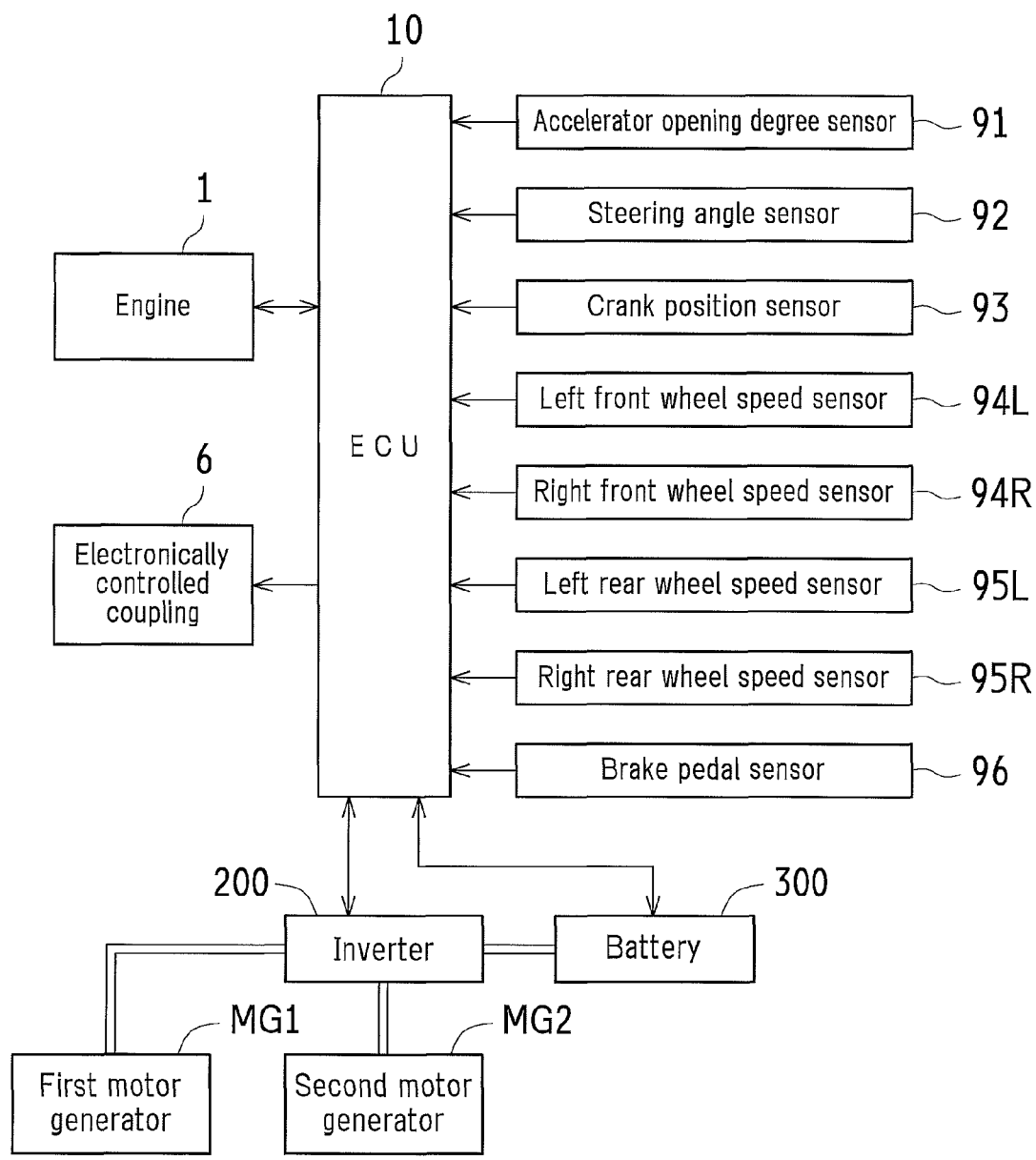
FIG. 12 is a block diagram illustrating a schematic configuration of a control system of the vehicle according to Variation 3.

As shown in FIG. 12, the first motor generator MG1 and the second motor generator MG2 are respectively connected to a battery (electricity storage device) 300 via an inverter 200. The inverter 200 is controlled by the ECU 10. By controlling the inverter 200, regeneration or power-running (assist) of each of the motor generators MG1 and MG2 is set. A regenerative force at this time is charged into the battery 300 via the inverter 200. Also, electric power for driving the motor generators MG1 and MG2 is supplied from the battery 300 via the inverter 200.

Power Splitter

As shown in FIG. 11, the power splitter 100 is configured by a planetary gear system that includes: a sun gear S3 with outer teeth that rotates at a center of a plurality of gear elements; pinion gears P3 with outer teeth that are circumscribed with the sun gear S3 and rotate and revolve around the sun gear S3; a ring gear R3 with inner teeth that is formed in a hollow annular shape so as to mesh with the pinion gears P3; and a planetary carrier CA3 that supports the pinion gears P3 and rotates by the revolution of the pinion gears P3. The planetary carrier CA3 is integrally rotatably coupled to the input shaft 13 on the side of the engine 1. The sun gear S3 is integrally rotatably coupled to the rotor MG1R of the first motor generator MG1.

The power splitter 100 transmits at least one of the driving forces out of the engine 1 and the second motor generator MG2 to the left and right front wheels 43L and 43R via the counter drive gear 121, the counter driven gear 122, the final gear 123, the front wheel differential device 41 and the front wheel shaft 42.

Reduction Mechanism

The reduction mechanism 110 is configured by a planetary gear system that includes: a sun gear S4 with outer teeth that rotates at a center of a plurality of gear elements; pinion gears P4 with outer teeth that are rotatably supported by a carrier (transaxle case) CA4 and that are circumscribed with the sun gear S4 while rotating; and a ring gear R4 with inner teeth that is formed in a hollow annular shape so as to mesh with the pinion gears P4. The ring gear R4 of the reduction mechanism 110, the ring gear R3 of the power splitter 100 and the counter drive gear 121 are integrally formed. Also, the sun gear S4 is integrally rotatably coupled to the rotor MG2R of the second motor generator MG2.

The reduction mechanism 110 decelerates at least one of the driving forces out of the engine 1 and the second motor generator MG2 at an appropriate deceleration ratio. Such a decelerated driving force is transmitted to the left and right front wheels 43L and 43R via the counter drive gear 121, the counter driven gear 122, the final gear 123, the front wheel differential device 41 and the front wheel shaft 42.

In the hybrid vehicle configured as described above, the pre-torque control is performed during turning of the vehicle, which is similar to the above-described embodiment. That is, the fastening force of the electronically controlled coupling 6 is controlled to give the pre-torque to the rear wheels 73L and 73R according to the rotary inertia of the rear wheels 73L and 73R (rotary inertia being small affected by the above-described cornering drag) when the vehicle turns while accelerating. After that, when the shift condition for the four-wheel drive state is established due to the slip and the like that occurs in the front wheels 43L and 43R, the fastening force of the electronically controlled coupling 6 is increased so as to give the drive torque for the four-wheel drive state to the rear wheels 73L and 73R, thereby the vehicle is shifted to the four-wheel drive state.

In this Variation, the same effect as the above-described embodiment can be obtained. That is, the rotary inertia of the rear wheels 73L and 73R, which is small due to the cornering drag, can be increased by giving the pre-torque. If the four-wheel drive shift condition is established subsequently, the driving force can be generated in the rear wheels 73L and 73R substantially at the same time that the fastening force of the electronically controlled coupling 6 is increased, thereby the shift to the four-wheel drive state is immediately completed. Consequently, the delay in response is not generated in the shift to the four-wheel drive state during turning of the vehicle.

Also, when the four-wheel drive shift condition is not established in the state in which the pre-torque is given to the rear wheels 73L and 73R, giving the pre-torque is cancelled subsequently. However, since the pre-torque is appropriately given to the rear wheels 73L and 73R during turning of the vehicle, it is possible to maintain the good turning performance. In this case, the pre-torque is restricted by the upper limit of the pre-torque, thus the good turning characteristic can be maintained.

Other Embodiments

In each of the above-described embodiment and the Variations, the description was given on the case in which the present invention is applied to the vehicle adopting the standby four-wheel drive system based on the FF vehicle. The present invention is not limited thereto. The present invention can also be applied to a vehicle (a conventional vehicle or a hybrid vehicle) adopting the standby four-wheel drive system based on an FR (front-engine rear-drive) vehicle. In such a case, the rear wheels are the main drive wheels and the front wheels are the driven wheels.

Also, in the above-described embodiment and the Variations, the pilot clutch type electronically controlled coupling 6 is adopted. However, the present invention is not limited thereto. A clutch direct pressing type electronically controlled coupling may be used. Also, the device is not limited to the electronically controlled coupling 6. Any other drive torque distributor may be used provided that such a distributor can change the distribution ratio of the drive torque to the front and rear wheels.

Also, in the above-described embodiment and the Variations, the present invention is exemplarily applied to the vehicle with the standby four-wheel drive system on which is mounted the transfer 51 made up of a counter gear. However, the configuration of the transfer is not particularly limited thereto. For example, the transfer may be the one having a mechanism in which a sprocket on the side of the main drive wheels and a sprocket on the side of the driven wheels are coupled to each other by a chain.

INDUSTRIAL APPLICABILITY

The present invention can be used for control of a vehicle during turning, the vehicle capable of being selectively switched between a two-wheel drive state to drive the vehicle by either front wheels or rear wheels and a four-wheel drive state to drive the vehicle by both of the front wheels and the rear wheels.

DESCRIPTION OF REFERENCE NUMERALS

1 Engine (drive force source)
43L, 43R Front wheels (main drive wheels)
73L, 73R Rear wheels (driven wheels)
6 Electronically controlled coupling
91 Accelerator opening degree sensor
92 Steering angle sensor
94L Left front wheel speed sensor
94R Right front wheel speed sensor
95L Left rear wheel speed sensor
95R Right rear wheel speed sensor
10 ECU
MG1, MG2 Motor generators (drive force sources)

The invention claimed is:

1. A vehicle control device for a vehicle including a driving force source outputting a drive torque for traveling, main drive wheels that are either front wheels or rear wheels and driven wheels that are the other of the front wheels or rear wheels, the vehicle capable of being switched between a two-wheel drive state to transmit the drive torque to only the main drive wheels and a four-wheel drive state to transmit the drive torque to both the main drive wheels and the driven wheels by changing a distribution ratio of the drive torque to the main drive wheels and the driven wheels, the vehicle control device, comprising:
   an electronic control unit for executing drive control of the vehicle, the electronic control unit including a central processing unit, a ROM, and a RAM having instructions stored therein and executable by the central processing unit, the electronic control unit configured to:
   when the vehicle accelerates in the two-wheel drive state while turning, apply a pre-torque, which is set to be larger as a cornering drag that acts on steered wheels is larger, to the driven wheels, and
   when a shift condition for the four-wheel drive state is established subsequently, apply to the driven wheels the drive torque to shift the vehicle to the four-wheel drive state.

2. The vehicle control device according to claim 1, wherein the pre-torque is obtained due to distribution of part of the drive torque for traveling to the driven wheels, and wherein the electronic control unit is further configured to restrict the pre-torque by an upper limit of the pre-torque so that a turning characteristic of the vehicle when the vehicle turns is improved due to the rotational speed of the rear wheels being higher than the rotational speed of the front wheels.

3. The vehicle control device according to claim 1,
wherein, when at least one of the turn and the acceleration of the vehicle is cancelled in a state in which the pre-torque is applied to the driven wheels, and
without establishment of the shift condition for the four-wheel drive state, the drive torque to shift the vehicle to the four-wheel drive state is not applied to the driven wheels and application of the pre-torque to the driven wheels is cancelled.

\* \* \* \* \*